C. L. FARIES.
OPEN WIRE TESTING INSTRUMENT.
APPLICATION FILED JUNE 29, 1910.

1,084,542.

Patented Jan. 13, 1914.
3 SHEETS—SHEET 1.

WITNESSES:
William Walter Watt.
Charles Weldon Bell.

Charles Lee Faries
INVENTOR.

UNITED STATES PATENT OFFICE.

CHARLES LEE FARIES, OF PHONETON, OHIO.

OPEN-WIRE-TESTING INSTRUMENT.

1,084,542.  Specification of Letters Patent.  Patented Jan. 13, 1914.

Application filed June 29, 1910. Serial No. 569,622.

*To all whom it may concern:*

Be it known that I, CHARLES LEE FARIES, a citizen of the United States, residing at Phoneton, in the county of Miami and State of Ohio, have invented an Open-Wire-Testing Instrument, of which the following is a specification.

The object of this invention is to provide an instrument, with which a wire or conductor of electricity can be tested for the approximate location of a fault in same, caused by the wire being broken open. With the instrument herein specified, this test can be made in a very short space of time, by any one familiar with the testing of wires, and the break or open located within sufficient nearness, and it will be particularly adapted to the testing of telephone aerial wires. I attain these objects, by the combination of electrical apparatus and the wiring of the circuits connecting same, as illustrated in the accompanying drawings, in which—

Figure 1:
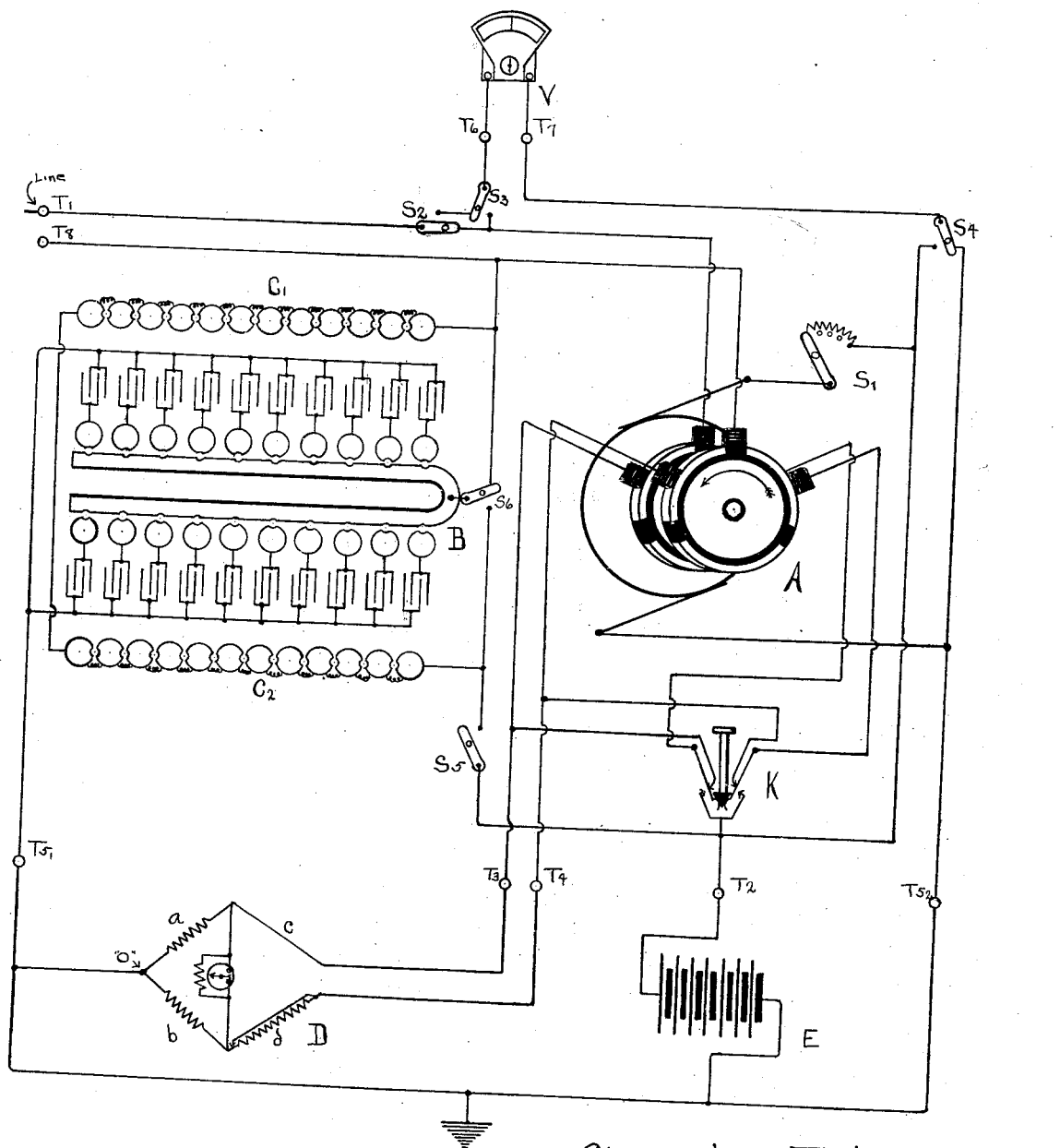

Figure 1, shows at A, a small direct current motor on the armature shaft of which is a double ring commutator, each ring having three segments of conducting material insulated from each other, and from the shaft; each ring being in contact with three brushes, one at the top, and one at each side, about forty-five degrees from a perpendicular line if drawn through center of shaft. At B, is an adjustable capacity box made up of condensers, ranging in capacity from .0125 to 2. mfds.; each condenser is connected to a brass disk, and these disks are placed along the side of a brass strip, in such a manner, so they can be connected to it by the insertion of a split brass plug between the disks and the strip. The condensers are connected to the two rows of ten disks, in the following sequence; reading from right to left, condenser capacities, .0125, .025, .05, .1, .2, .3, .5, .75, 1., 2., mfds., making a total of 9.875 mfds. At $C_1$, and $C_2$, is a rheostat in which the resistance coils range from 1. to 5000., ohms, arranged in the following order; reading from the right side of $C_1$, toward the left, resistance coils are connected between the twelve disks in the folowing sequence, resistances 1., 1., 2., 2., 3., 3., 5., 10., 20., 30., 40., ohms, thence from the left side of $C_2$, to the right, resistance coils are connected between the twelve disks, in the following sequence; resistances, 50., 100., 200., 300., 400., 500., 1000., 2000., 3000., 4000., 5000., ohms, making a total resistance of 16,667. ohms. At K, is a push spring key, the function of which is to open two contact points and to close two other contact points, upon being pressed down. At $S_1$, is a starting rheostat for the motor. At $S_2$, $S_3$, $S_4$, $S_5$, and $S_6$, are one lever two point switches, for making contacts in circuits as shown and as hereinafter described. At $T_1$, and $T_8$, are terminal jacks for the insertion of wire or conductor which is to be tested. At $T_2$, is a terminal jack for the insertion of a battery tap. At $T_3$, and $T_4$, are terminal jacks for the insertion of the Wheatstone bridge arms $c$ and $d$, respectively. At $T_{51}$, and $T_{52}$, are terminal jacks for the insertion of a ground wire. At $T_6$, and $T_7$, are terminal jacks for the insertion of the voltmeter leads. At D, is a Wheatstone bridge and shunt galvanometer. At E, is a battery, preferably a sixty volt storage battery. At V, is a double reading scale voltmeter.

Figure 2:
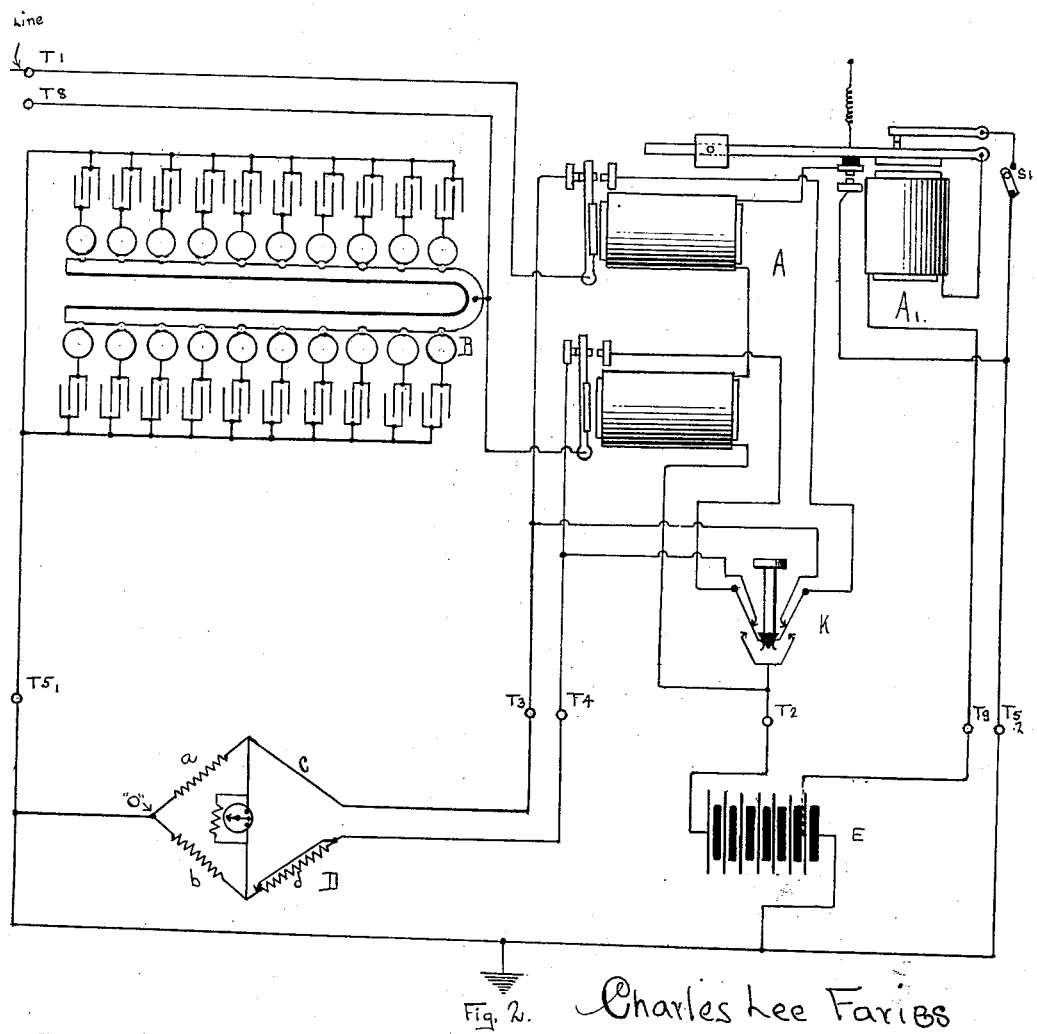

Fig. 2, is a simpler form of the instrument, in which the motor and ring commutators are replaced by two telegraph relays, shown at A, with front and back contacts for their armatures, these relays being vibrated in unison, by the action of a small voltage sounder or buzzer with a vibrating armature, shown at $A_1$, in an open and closed circuit. These two telegraph relays can either be vibrated as shown, or an alternating or pulsating current can be used for this purpose, if desired, if of a low frequency by connecting same to the relay circuit. The resistance rheostat $C_1$, and $C_2$, the switches $S_2$, $S_3$, $S_4$, $S_5$, $S_6$, the terminal jacks $T_6$ and $T_7$, are omitted and terminal jack $T_9$, added in this instrument, terminal jack $T_9$, is added for the insertion of a small battery tap as shown. Switch $S_1$, closes the circuit which operates the sounder or buzzer, which in turn, vibrates the two relays in unison, through the action of contact in relay circuit, which is carried on armature of sounder or buzzer, and is opened and closed by same.

Figure 3:
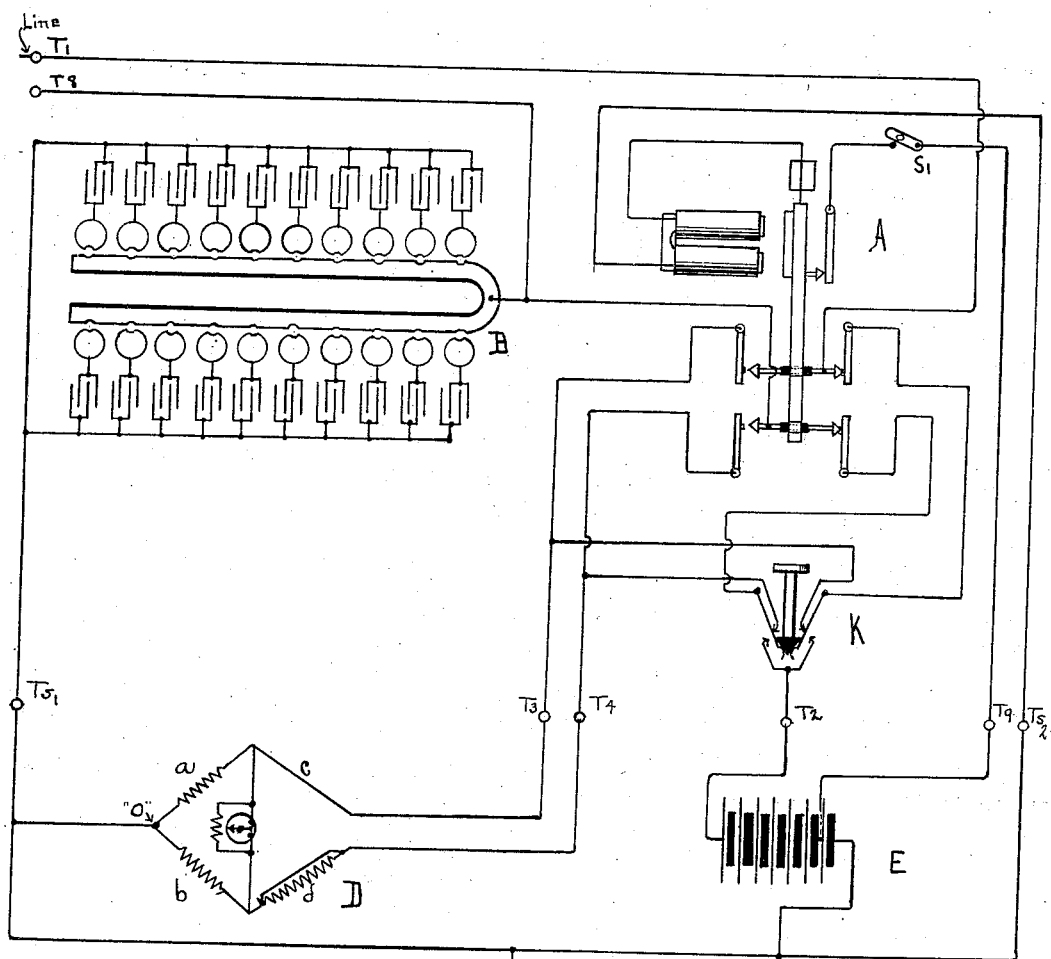

Fig. 3, is the same as Fig. 2, except that the two telegraph relays are replaced by one vibrating relay, shown at A.

The switches shown in these drawings, would preferably be platinum contact lever keys, and the terminal contacts can be terminal posts, or soldered contact clips, but were shown as drawn, for simplification of detail.

*Method of operation.*—Referring to Fig. 1, one end of the wire or conductor which is broken open between two testing stations, and which it is desired to test, for location of break, is inserted at $T_1$. A tap from a 60 volt battery, having the opposite polarity tap grounded, is inserted at $T_2$. A Wheatstone bridge, with shunt galvonometer, D, the arms $c$, and $d$, of which are inserted at $T_3$, and $T_4$, respectively, and having the point "$o$" grounded, either direct as shown, or through a telegraph relay for small impedance. A double-reading scale voltmeter V, having the leads from same inserted at $T_6$, and $T_7$. A ground wire is inserted at $T_{5\,1}$, and $T_{5\,2}$. The switch $S_1$, is thrown to the left a little more than is shown, or open, switches $S_2$, $S_3$, $S_4$, $S_5$, and $S_6$, making contact as shown, bridge arms $a$, and $b$, are made 100 ohms resistance each, all the resistance is cut out of arm $d$, the galvanometer is shunted to its lowest current.

First, the condition of wire or conductor is ascertained by the action of galvanometer needle. If the wire which is being tested is in contact with ground, where broken, the galvanometer needle will be deflected to one side, on account of the difference in the potential of the two grounds connected, one at the broken wire, and one at point "$o$". This difference of potential will cause a current to flow, from break to wire; to top brush on ring of the inner commutator; thence to left hand brush of same ring; to bridge arm $c$; (bridge arm $a$, and galvanometer-bridge arm $b$ in multiple) to point "$o$", or reverse, thus deflecting needle to one side or the other. The battery is disconnected for this test. As the needle responds to very minute currents, the resistance of the ground at break can be very high or very low and the same result be obtained. This will be the effect generally in the United States, the ground potentials at different points, even short distances apart, are affected by the numerous electrical operation of traction railways and power stations using ground to one potential, especially so in the middle Western States. The condition of wire can be verified in another way, if no deflection is shown, as is explained later.

The ideal condition of wire for a test, is when no deflection of needle is shown. This condition can be obtained in a majority of cases of opens, either from one end of the wire, or from the other, on account of wires breaking more frequently near a pole, than the middle of a section, thus leaving one end of the wire in the air, and the other end on the ground. When the wire is in this condition tests can be taken by instruments shown in Figs. 1, 2, and 3, while, when wire is in contact with ground at the break, a test with instrument shown in Fig. 1, only can be taken, except as explained later by using Wheatstone bridge resistance rheostat in arm $d$, separate from bridge.

A test of a wire or conductor showing no deflection on galvanometer needle, when instrument is connected up as described above; is made as follows: Switch $S_1$, is now thrown to the right, this starts the motor revolving from right to left, gradually increasing in speed as current in motor circuit is increased by the cutting out of resistance in switch $S_1$. Key K, is then pressed down, this breaks the contacts connecting the two right hand brushes to bridge arms $c$, and $d$, and closes the contacts, which puts the two right hand brushes in contact with the positive terminal of battery E, this battery having its negative terminal grounded. The potential of battery E, causes a current to flow through right hand brushes; to segment of rings; to top brushes; thence to wire or conductor; and to capacity-box B, in multiple, then upon revolution of commutator, the right hand brush contacts with segments, are broken, and segments immediately make contact with left hand brushes, which allows the charge, which is now held by wire and capacity box, to discharge through the two sides of the bridge to ground at "$o$;" as the revolution of motor is very rapid, this discharge through bridge is almost continuous. As the charge held by the wire or conductor, is much larger than that held by capacity box: none of the condensers being plugged in, part of this charge will flow across galvanometer from arm $c$, to arm $b$, deflecting needle to one side, and the needle can be brought to rest on center, by plugging in enough condenser capacity in box B, to equal capacity of wire or conductor.

The sum of the capacities required in box, to balance the needle, when testing a wire or conductor broken open between testing stations, which equals capacity of wire or conductor from testing station to the open, when compared with the capacity of a wire or conductor of the same characteristics, open at the distant station, (tested and found in the same manner) will be proportionate to their respective lengths. Thus showing the length of defective wire or conductor from testing station to the open.

When arms $a$, and $b$, of bridge are equal, then $$AC = Bx$$

and $$x = \frac{AC}{B}$$

where A=length of unbroken wire, B=capacity of unbroken wire, C=capacity plugged in box, i. e. capacity of near portion of broken wire, $x$=length of broken wire testing station to break.

If the capacity of wire or conductor being tested, is very small, the following verification of condition of wire or conductor should be made, throw switch $S_2$ to upper contact, switch $S_3$ as shown, switch $S_4$, to left hand contact, thus putting grounded battery E, direct to wire or conductor, through voltmeter V, the deflection of voltmeter will then show condition of insulation resistance of wire or conductor, in case the wire or conductor was in contact with ground at the break, and there being no difference in the ground potential of the two grounds, the galvanometer needle would fail to show the true condition of wire or conductor; but the fact of so little capacity being shown, would indicate that either the greater part of the charge was escaping through a ground contact at break, or that the open was very close to testing station, and if the voltmeter shows high insulation resistance on the wire or conductor, the second conclusion of open being near testing station, can be taken as true.

It would be presumed that induction on the wire being tested, picked up from adjoining wires, would affect the galvanometer needle, but on wires that are transposed according to latest methods, by telephone companies, this is not the case the needle remaining almost perfectly steady on center, when capacity of wire or conductor and box are equal, probably the needle being shunted to its smallest current, is too slow in action to respond to any of the small induced currents which flow across it. Another supposition would be that the quicker discharge of the box, would affect the needle before the wire or conductor discharge which is held back by the resistance of the wire or conductor, thus giving two impulses to the needle, but in fact the needle is affected only by the heavier discharge.

In cases where the relative resistance and capacity of wire or conductor is known switch $S_6$ can be thrown to lower contact, then capacity box B, will be charged and discharged through resistance rheostat $C_1$, and $C_2$, and a specified amount of resistance and capacity can be plugged in together, or the disks on capacity box B, and on resistance rheostat $C_1$, and $C_2$, can be so arranged that one plug will cut in the specified amount of resistance and capacity desired, but this is not necessary in the above test.

Very small capacities can be accurately measured by proportioning the bridge arms $a$, and $b$, 10 to 1 respectively, the resulting capacity plugged in box to obtain a balance on needle will then have the same ratio to the wire capacity as $a$, arm has to $b$, arm.

Making arm $a$, 100 ohms and arm $b$, 10 ohms, then $$aC' = bC$$

and $$C' = \frac{Cb}{a}$$

where $a = a$ arm of bridge, $b = b$ arm of bridge, C=capacity plugged in box in mfds., $C'$=capacity of wire tested in mfds.

Another verification of the condition of wire or conductor, can be made by throwing switch $S_2$, to upper contact, switches $S_3$, and $S_4$, as shown, deflection of voltmeter will then show any difference of potential between a possible ground at break, and the ground at "$o$," and the direction of current flow can be obtained.

The test as described above for wire or conductor having a good insulation resistance to the break, can also be taken on a wire or conductor, when wet weather conditions have caused a distributed leak on the wire; this condition is found on most telephone companies' wires to-day, the practice being to maintain an insulation resistance of 10 megohms per mile in dry weather.

The ratio of the capacity of a broken wire, to the capacity of an unbroken wire, of the same characteristics corresponds to their length.

Tests have been made with this instrument, where the deflection on a voltmeter in series with an unbroken wire, open sixty-five miles distant, showed forty volts, to a battery voltage of sixty through voltmeter to ground; and good results obtained.

Instrument shown in Fig. 2 is used as described above for Fig. 1, the only difference, as will be seen, being that the armature of one telegraph relay is connected to the wire or conductor, at $T_1$, and the armature of the other telegraph relay is connected to the capacity box B, they both accept a charge from battery E, upon pressure of key K, from the front contacts, and then discharge through the back contacts, to the two sides of the bridge to ground at point "$o$," thus performing the same function as commutator on motor shaft A Fig. 1. A small voltage tap is taken from battery E, and inserted at $T_9$, which, upon closing switch $S_1$, Fig. 2, operates the sounder A' on an open and closed circuit, which in turn vibrates the two telegraph relays in unison, by action of contact on sounder armature which is in relay circuit. As front contacts of relays are connected to the same bridge arms as the back contact of the same relay until the key K, is pressed, the galvanometer needle is ready to respond to any current picked up from the wire, up to the time it is affected by the discharge produced by pressure of key K, either with relays vibrating or at rest. The same arrangement is made in Fig. 1, as both side brushes on each ring are connected to the same arm of bridge until key K, is pressed down. If alternating or pulsating current is used for the vibration of the two telegraph relays, the relay circuit will be terminated at $T_2$, and on an additional jack, not shown, and the vibrating sounder and its circuit will be omitted.

The instrument shown in Fig. 3, can be used for the test described above, but the operation here is by one vibrating relay A, with the necessary contact points, which perform the same function as A, Fig. 1, and A, and A', Fig. 2, as will be readily seen from drawing. The two instruments, shown in Fig. 2, and Fig. 3, are much simpler and cheaper in construction, and they are designed principally for making the test described above, although the motor and commutator shown in Fig. 1, will be more reliable, on account of the liability of the relay armatures Fig. 2, not vibrating in perfect unison, which would tend to throw a false deflection on galvanometer needle, although, this can be readily detected by the sound of the vibrating relays; the contact points of vibrating relay Fig. 3, must also be kept adjusted so the armature contacts strike both points on the one side at the same time, or the same defect will be shown.

Another method of testing a wire or conductor, showing high insulation resistance, is to insert one end of an unbroken wire, open at distant testing station at $T_1$, and to insert one end of the broken wire at $T_3$, Figs. 1, 2, and 3, then the capacity which it is necessary to plug in capacity box B. to balance the galvanometer needle, when bridge arms $a$, and $b$, are equal, will have the same ratio to the capacity of the unbroken wire, (taken as described above) as the length of broken wire, from break to distant testing station, has to the length of unbroken wire between testing stations.

When bridge arms $a$, and $b$, are equal, then $$AC = BY;$$

and $$Y = \frac{AC}{B}$$

where A = length of unbroken wire, B = capacity of unbroken wire, C = capacity plugged in capacity box to balance needle, Y = length of broken wire, from break to distant testing station.

This will show short however on account of the decrease of potential of charging battery as distance increases from testing station, better results being obtained by test first described, although there is a shortage also shown with it on long wires, it is much smaller, and as man making the tests becomes familiar with the wire capacities under different weather conditions, it will only be necessary for a test to be made on the wire that is broken taken as first described to enable person making test to send repair man within short distance of the break.

A test is made with instrument shown in Fig. 1 when wire to be tested is in contact with ground as follows: After the instrument is connected to wire and other apparatus as described in first test, this condition of wire will be apparent from the galvanometer needle being deflected to one side, by action of current set up by difference in potential of ground at break and at "$o$" as described before. Throw switch $S_2$, to top contact, switch $S_3$, and $S_4$, as shown, then voltmeter will show potential of ground current flowing. If this is not a potential which will cause the flow of a current through the corresponding side of the Wheatstone bridge in the same direction as that which would be caused by battery E to flow through the other side of the Wheatstone bridge, the battery connections are charged so that the two currents will flow through the opposite sides of the Wheatstone bridge in the same direction. Then throw switch $S_2$, back to lower contact, switch $S_5$, to right hand contact, and adjust the resistance in rheostat $C_1$, and $C_2$, by inserting split brass plugs, until galvanometer needle is balanced on center, by an equal amount of current flowing from battery E, through rheostat $C_1$, and $C_2$, thence to top brush on capacity box ring of commutator, thence to left hand brush, to bridge arm $b$, and $b$, to ground at "$o$" as is flowing through wire, to top brush on wire ring of commutator, thence to left hand brush, to bridge arm $c$ and $a$ to ground at "$o$". Needle will probably swing slowly off center and back again from change in ground potential. Throw switch $S_1$, starting motor revolving, then upon pressing key K down the wire or conductor, and the capacity box will be charged as before, and the difference of their capacity discharges through bridge to ground will affect the galvanometer needle as a kick to one side, which can be eliminated by plugging in condenser capacity in the box to make an equal capacity discharge as is being received from the wire. This capacity will be proportionate to the capacity the wire would show, if open at break, in the same ratio as $\delta_3$ is to $\delta_2$; $\delta_1$ being a deflection of voltmeter taken from battery to wire, for leak to ground, by throwing switch $S_2$ to top contact, switch $S_3$ to left hand contact, switch $S_4$ to left hand contact, plus a deflection of voltmeter taken from wire to ground, for ground potential, by throwing switch $S_2$ to top contact, switch $S_3$ to left hand contact, and switch $S_4$ to right hand contact; $\delta_2$ being a deflection of voltmeter taken from battery to ground through bridge, by throwing switch $S_2$ to top contact, switch $S_3$ to right hand contact, switch $S_4$ to left hand contact, $\delta_3$, being the difference of the above two deflections. The charge to wire and the deflection shown to wire are both cut down by the ground potential, and as $\delta_2$ is not affected by it, we add the ground potential to deflection to wire to obtain $\delta_1$, this being the actual deflection to wire, if no ground current was flowing, thus keeping its ratio to $\delta_2$ the same as is the leak to the whole charge. That is, of the whole charge given the wire, part returns to the ground at "o" and is equaled by capacity plugged in box, the balance escapes by ground contact at break, and as these two discharges are governed by the relative resistance of the two grounds and as the voltmeter resistance is so high, that the wire resistance itself, and the resistance through bridge to ground, have no appreciable effect on the deflections, these two deflections $\delta_1$ and $\delta_2$ practically represent that part of the charge which escapes at break, and the whole discharge which would return through bridge to ground, if wire was open at break, respectively, and the difference between the two deflections $\delta_3$, would therefore represent that part of the charge which actually does return from the wire when same is grounded through resistance at break.

Hence the ratio $$C^1 : C :: \delta_3 : \delta_2,$$

and $$C^1 \delta_2 = C \delta_3.$$

and $$C = \frac{C^1 \delta_2}{\delta_3},$$

and as $$AC = Bx, \text{ as in first test,}$$

then $$A \frac{C^1 \delta_2}{\delta_3} = Bx,$$

and $$x = \frac{AC^1 \delta_2}{B \delta_3}$$

where A=length of unbroken wire between test stations, B=capacity of unbroken wire between test stations, C=capacity, broken wire would show if open and clear at break, $x$=length of broken wire test station to break, $C^1$=capacity discharge of broken wire through bridge to ground equaled by capacity plugged in box, $\delta_1$=voltmeter deflection to wire, plus deflection shown for ground potential, $\delta_2$=voltmeter deflection to ground through bridge, $\delta_3$=difference of above two deflections.

If $C^1$ is very small it may not affect the galvanometer needle appreciably in this case the bridge arms $a$, and $b$, will have to be proportioned 10, to 1, respectively, and this will necessitate re-adjustment of resistance in rheostat $C_1$ and $C_2$ Fig. 1, to balance the galvanometer needle on center again, before attempting to take the test, when this is done the needle will respond to the pressure of key K by a kick to one side, until balanced on center by plugging in capacity, in box. The capacity plugged in box will then be ten times as large as the capacity discharge received from wire.

Making bridge arm $a$, 100, and arm $b$ 10 ohms, then $$a : b :: C_2 : C^1$$

and $$C^1 = \frac{C_2 b}{a}$$

and as before $$C = \frac{C^1 \delta_2}{\delta_3}$$

then $$C = \frac{\frac{C_2 b}{a} \delta_2}{\delta_3}$$

and as $$AC = Bx, \text{ as in first test,}$$

then $$A \frac{\frac{C_2 b}{a} \delta_2}{\delta_3} = Bx,$$

and $$x = \frac{Ab C_2 \delta_2}{Ba \delta_3}$$

where A=length of unbroken wire between test stations, B=capacity of unbroken wire between test stations, C=capacity broken wire would show if open, clear at break, $x$=length of broken wire test station to break, $C^1$=capacity discharge of broken wire through bridge to ground, $C_2$=capacity plugged in box, $a$=reading of bridge arm $a$, (i. e. 100 ohms,) $b$ reading of bridge arm $b$, (i. e. 10 ohms,) $\delta_1$=voltmeter deflection to wire, plus deflection shown for ground potential, $\delta_2$=voltmeter deflection to ground through bridge, $\delta_3$=difference of above two deflections.

This test, on account of the small capacities handled, is a more delicate test than the first test, and probably will not be so often used, although, as good results were obtained with it, and it furnishes a means of locating a break on a wire or conductor which is broken open and grounded through unknown resistance, thus filling a demand for a test, which at the present time is not filled, I believe it will be successfully used, and of great benefit. This test could be taken with instruments shown in Figs. 2 and 3 if the bridge circuit was arranged so the resistance rheostat in arm $b$ could be cut out and used in place of $C_1$ and $C_2$ Fig. 1, and voltmeter deflection taken to wire and to ground before instrument was put up for test, but one of the objects in getting this instrument out was to furnish an instrument for use with other instruments connected as they are in general use in testing wires. So the instruments shown in Figs. 2 and 3 will probably only be used for first test.

The time when these instruments will be most needed, is in very cold weather when most of the trouble caused by wires breaking open occur, and at this time when ground is frozen or covered with dry snow, conditions for the test is most favorable as wires will then show the best insulation resistance to break, and when snow is deep and travel bad, it is very desirable to locate trouble, in order to use the quickest method of transportation to get the repairman to the break.

While I have illustrated and described the preferred construction for carrying my invention into effect, this is capable of variation or modification without departing from the spirit of the invention. I therefore do not wish to be limited to the exact details of construction set forth but desire to avail myself of such variations and modifications as come within the scope of the appended claims.

Having fully described my invention, what I claim as new and desire to secure by Letters Patent is:

1. An electrical device for determining the relative capacities of two electrical conductors comprising in combination a Wheatstone bridge circuit including a known capacity in one arm thereof, an unknown capacity connected in the other arm thereof, and means for simultaneously, automatically and rapidly connecting said capacities directly to the electromotive force and then immediately and simultaneously discharging said capacities through the resistance arms of said bridge or the opposite.

2. An electrical device for determining the relative capacities of two conductors comprising a testing device including two resistances, a current detecting device connected to each resistance, and a switch interposed between the detecting device and the two capacities to be compared whereby the capacities will be rapidly, simultaneously and alternately charged from an electromotive force and then discharged through said resistance, the current pulsations through the resistances being unidirectional.

3. An electrical device for determining the relative capacities of two conductors comprising a testing device including two resistances, a current detecting device connected to each resistance, and means for simultaneously, automatically and alternately charging the conductors from an electromotive force and then discharging said conductors through said resistances, the current pulsations through the resistances being unidirectional.

4. An instrument of the class described comprising a Wheatstone bridge; a condenser; a conductor to be tested; and means for alternately charging both said condenser and said conductor independently of said Wheatstone bridge and connecting said condenser and conductor in opposite arms of said bridge and permitting their discharge through said arms.

5. An instrument of the class described comprising a Wheatstone bridge; a variable condenser; a conductor to be tested; and means for alternately charging said condenser and said conductor independently of said Wheatstone bridge and connecting said condenser and conductor in opposite arms of said bridge and permitting their discharge through said arms.

6. An instrument of the class described comprising a Wheatstone bridge; a condenser; a conductor to be tested; and means for alternately charging both said condenser and said conductor independently of said Wheatstone bridge and connecting said condenser and conductor in opposite arms of said bridge and permitting their discharge through said arms to the ground.

7. An instrument of the class described comprising a Wheatstone bridge; a variable condenser; a conductor to be tested; and means for alternately charging said condenser and said conductor independently of said Wheatstone bridge and connecting said condenser and conductor in opposite arms of said bridge and permitting their discharge through said arms to the ground.

8. An instrument of the class described comprising a Wheatstone bridge; a condenser; a conductor to be tested; a variable resistance in series with said condenser; and means for alternately charging both said condenser and said conductor independently of said Wheatstone bridge and connecting said condenser and conductor in opposite arms of said bridge and permitting their discharge through said arms.

9. An instrument of the class described comprising a Wheatstone bridge; a variable condenser; a conductor to be tested; a variable resistance in series with said condenser; and means for alternately charging both said condenser and said conductor independently of said bridge and connecting said condenser and conductor in opposite arms of said bridge and permitting their discharge through said arms.

10. An instrument of the class described comprising a Wheatstone bridge; a variable condenser; a conductor to be tested; a variable resistance in series with said condenser; and means for alternately charging both said condenser and said conductor independently of said bridge and connecting said condenser and conductor in opposite arms of said bridge and permitting their discharge through said arms to the ground.

11. An instrument of the class described comprising a Wheatstone bridge; a condenser; an unbroken strung wire open at a distant station; a wire to be tested connected in parallel with said condenser; and means for alternately charging said unbroken wire and both said wire to be tested and said condenser independently of said Wheatstone bridge and connecting said unbroken wire and said wire to be tested and said condenser in opposite arms of said bridge and permitting their discharge through said arms.

12. An instrument of the class described comprising a Wheatstone bridge; a variable condenser; an unbroken strung wire open at a distant station; a wire to be tested connected in parallel with said condenser; and means for alternately charging said unbroken wire and both said wire to be tested and said condenser independently of said Wheatstone bridge and connecting said unbroken wire and said wire to be tested and said condenser in opposite arms of said bridge and permitting their discharge through said arms.

13. An instrument of the class described comprising a Wheatstone bridge; a condenser; an unbroken strung wire open at a distant station; a wire to be tested connected in parallel with said condenser; and means for alternately charging said unbroken wire and both said wire to be tested and said condenser independently of said Wheatstone bridge and connecting said unbroken wire and said wire to be tested and said condenser in opposite arms of said bridge and permitting their discharge through said arms to the ground.

14. An instrument of the class described comprising a Wheatstone bridge; a variable condenser; an unbroken strung wire open at a distant station; a wire to be tested connected in parallel with said condenser; and means for alternately charging said unbroken wire and both said wire to be tested and said condenser independently of said Wheatstone bridge and connecting said unbroken wire and said wire to be tested and said condenser in opposite arms of said bridge and permitting their discharge through said arms to the ground.

15. An instrument of the class described comprising a Wheatstone bridge having both of its ratio arms grounded; a variable condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

16. An instrument of the class described comprising a Wheatstone bridge having both of its ratio arms grounded; a condenser; a variable resistance in series with said condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

17. An instrument of the class described comprising a Wheatstone bridge having both its ratio arms grounded; a variable condenser; a galvanometer arranged in said bridge; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

18. An instrument of the class described comprising a Wheatstone bridge having both of its ratio arms grounded; a variable condenser; a galvanometer arranged in said bridge; a resistance in series with said condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

19. An instrument of the class described having both of its ratio arms grounded and a variable resistance in each arm; a variable condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

20. An instrument of the class described comprising a Wheatstone bridge having both of its ratio arms grounded and a variable resistance in each arm; a variable condenser; a resistance in series with said condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

21. An instrument of the class described having both of its ratio arms grounded and a variable resistance in each arm; a variable condenser; a galvanometer arranged in said bridge; a resistance in series with said condenser; a motor; commutator rings connected with said motor; a brush adapted to be connected with a conductor to be tested and contacting with one of said rings; a brush contacting with the other ring and connected with said condenser; a battery having one end grounded; brushes connecting the other end of said battery with each of said rings on one side of said first mentioned brushes; and brushes connecting the different arms of said bridge with the different rings on the other side of said first mentioned brushes, substantially as described.

CHARLES LEE FARIES.

Witnesses:
WILLIAM WALTER WATT,
CHARLES WELDON BELL.